Oct. 1, 1957 E. R. BERGMANN ET AL 2,808,145
EXTENSIBLE BELT CONVEYORS
Filed Dec. 6, 1955 3 Sheets-Sheet 1
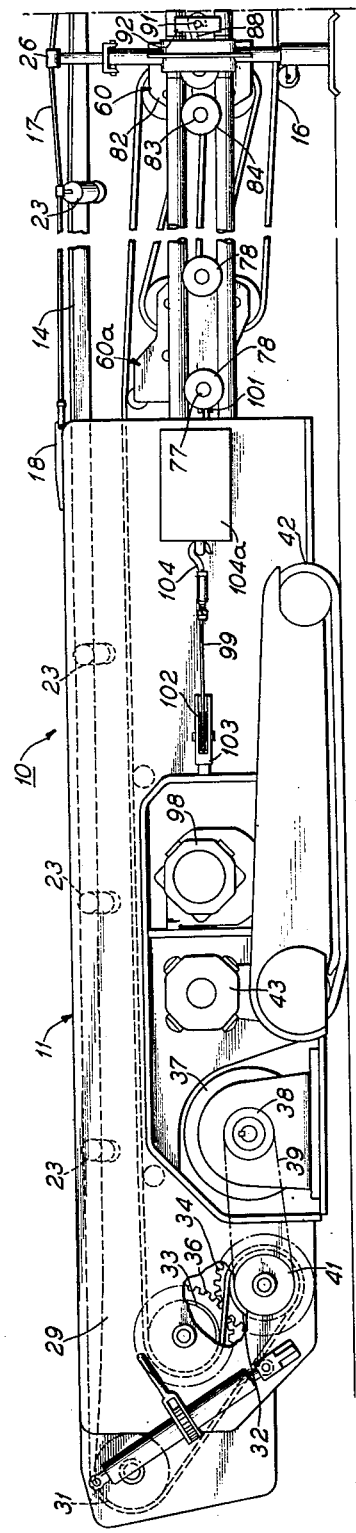
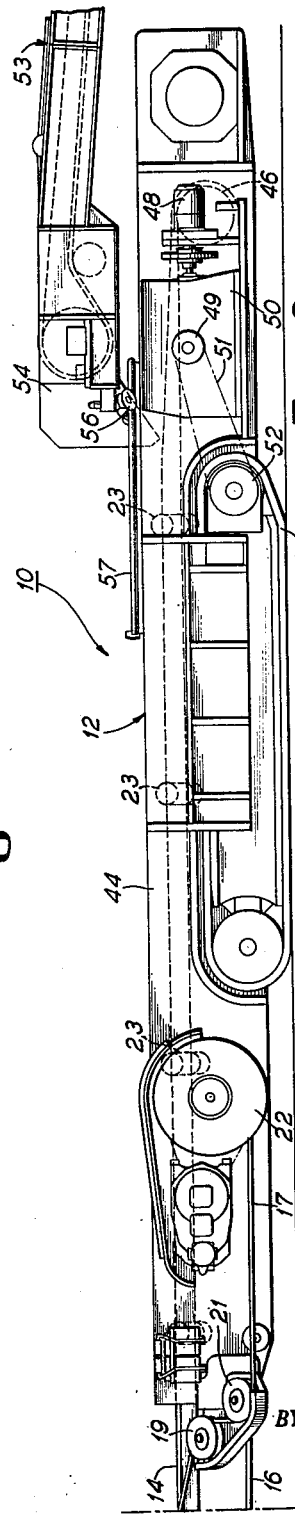
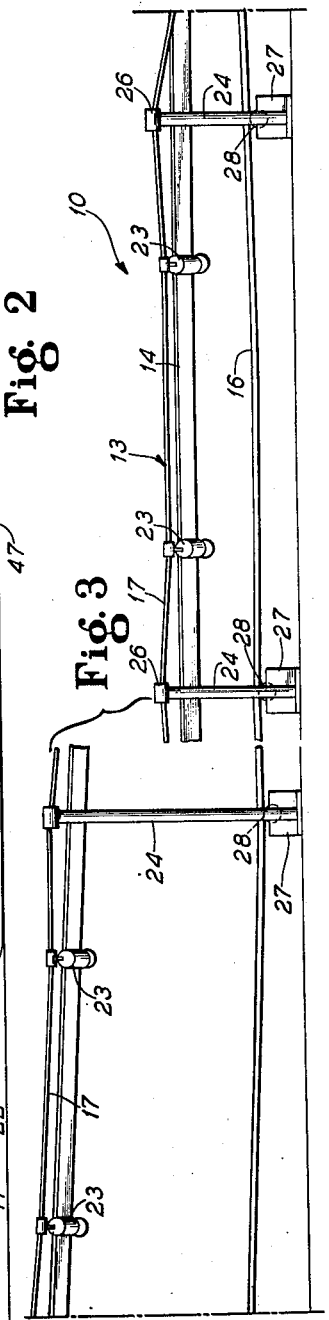
INVENTOR.
Ernst R. Bergmann
John R. Madeira
BY Murray A. Gleeson
ATTORNEY Oct. 1, 1957   E. R. BERGMANN ET AL   2,808,145
EXTENSIBLE BELT CONVEYORS
Filed Dec. 6, 1955   3 Sheets-Sheet 2
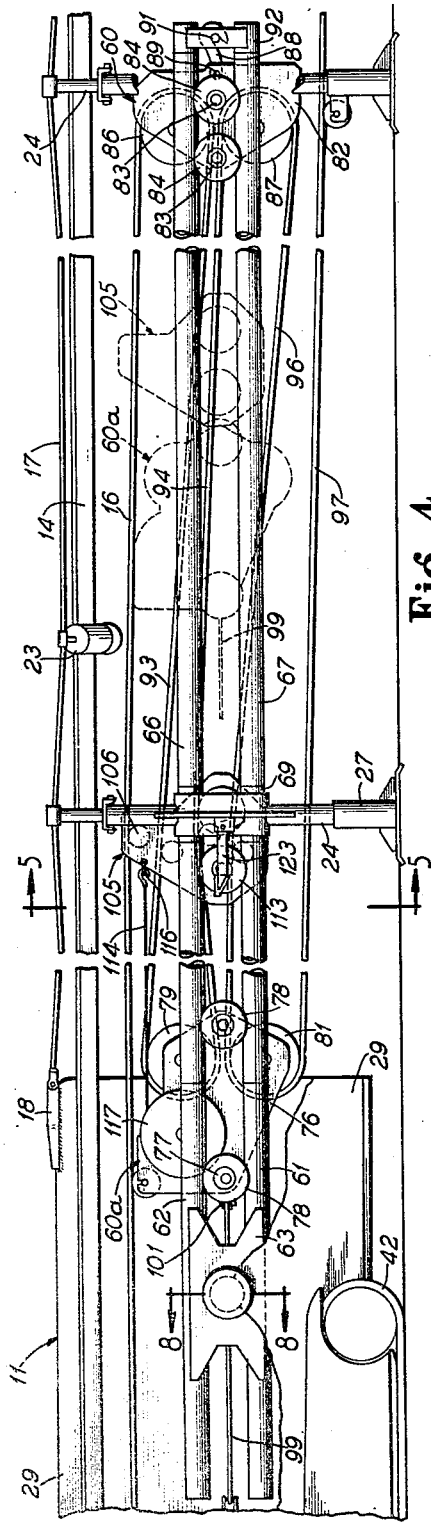
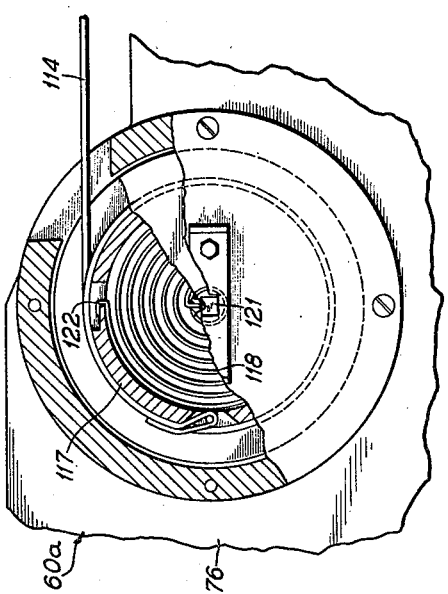
INVENTOR.
Ernst R. Bergmann
John R. Madeira
BY
Murray A. Gleeson
ATTORNEY Oct. 1, 1957  E. R. BERGMANN ET AL  2,808,145
EXTENSIBLE BELT CONVEYORS
Filed Dec. 6, 1955  3 Sheets-Sheet 3
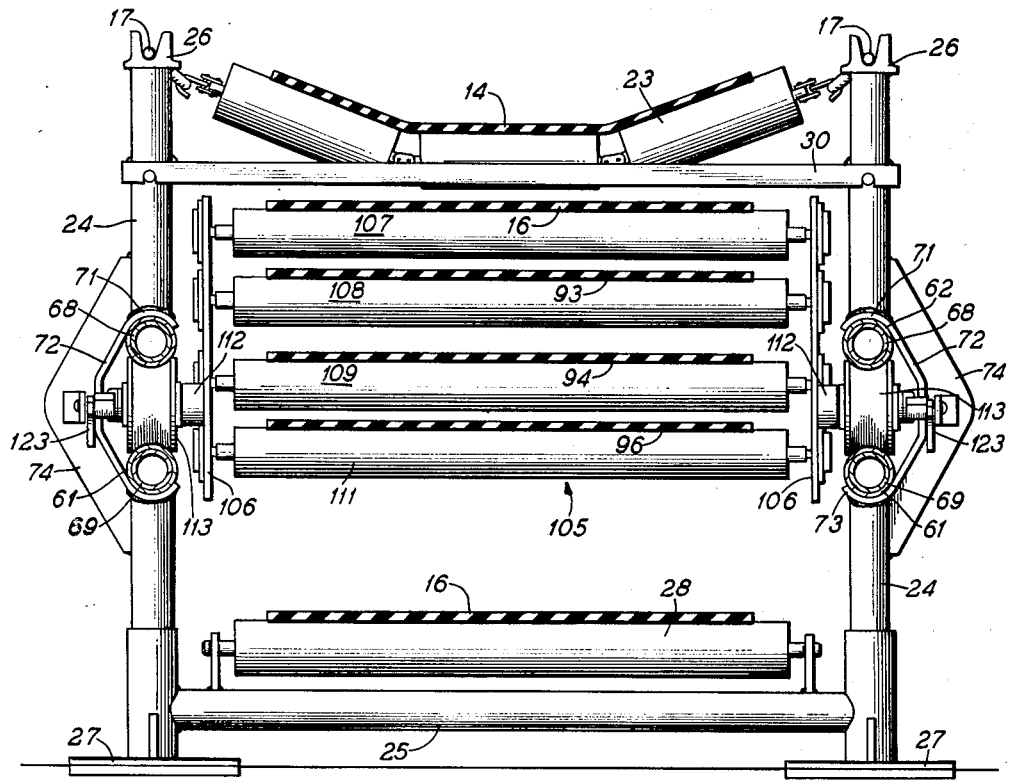
Fig. 5
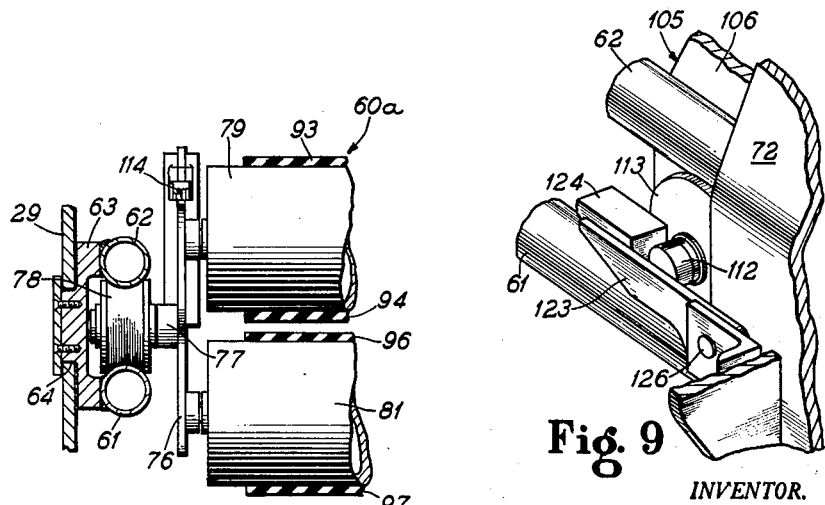
Fig. 8
Fig. 9
INVENTOR.
Ernst R. Bergmann
BY John R. Madeira
Murray G. Gleeson
ATTORNEY

United States Patent Office 2,808,145
Patented Oct. 1, 1957

2,808,145

EXTENSIBLE BELT CONVEYORS

Ernst R. Bergmann, Evergreen Park, and John R. Madeira, Chicago, Ill., assignors to Goodman Manufacturing Company, Chicago, Ill., a corporation of Illinois Application December 6, 1955, Serial No. 551,317

8 Claims. (Cl. 198—139)

This invention relates generally to extensible belt conveyors and more particularly to improvements in belt take up loops for such a conveyor.

In belt conveyors of the extensible type belt storage is achieved by a pair of idler assemblies around which additional belting is reeved, the distance between the carriages varying in accordance with the length of the conveyor. When the conveyor is at its shortest length, the idler assemblies are at their greatest distance apart, and the sag of the belt between the idler assemblies may be sufficient to cause rubbing of the belt reaches on each other, thus greatly increasing both belt wear and the power required for belt movement.

The aforesaid condition is obviated by the use of an auxiliary idler assembly mounted for movement between the two previously mentioned idler assemblies and arranged to support the reaches of the belt reeved at said idler assemblies. Such auxiliary idler assembly is arranged to be moved upon dismantling of the conveyor on to an end section thereof together with the aforesaid idler assemblies.

With the foregoing considerations in mind it is a principal object of the invention to provide a simple construction for supporting the reaches reeved between idler assemblies of an extensible belt conveyor.

Another object of the invention is to provide an auxiliary idler assembly for an extensible belt conveyor whereby the reaches reeved between the idler assembly for the belt storage loops will be supported, and thereby prevent rubbing of the reaches on each other.

Other objects and important features of the invention will be apparent from a study of the specification following taken with the drawings, which together describe and illustrate a preferred embodiment of the invention and what is now considered to be the best mode of practicing the principles thereof. Other embodiments of the invention may be suggested to those having the benefit of the teachings herein and it is therefore intended that the scope of the invention not be limited by the precise embodiment herein shown, the scope of the invention being intended to be defined by the claims subjoined.

In the drawings:

Fig. 1 is an elevation view of the head unit of an extensible conveyor having the improvements according to the present invention embodied therein;

Fig. 2 is an elevation view of the tail unit of such extensible conveyor;

Fig. 3 is an elevation view of a number of intermediate sections located between the head and tail sections shown in Figs. 1 and 2, such intermediate sections supporting the conveying and return reaches of a conveyor belt which extends between the head and tail unit shown in Figs. 1 and 2;

Fig. 4 is an elevation view of a portion of the extensible conveyor seen in Figs. 1, 2 and 3, showing details of belt storage loops which can be shortened in accordance with the advance of the tail section seen in Fig. 2 in following the advance of a continuous miner or the like, and showing the auxiliary idler assembly for supporting the reaches of the belt at the belt storage loops;

Fig. 5 is a vertical elevational view, certain parts being shown in section, looking in the direction of the arrows 5—5 of Fig. 4;

Fig. 6 is a detailed elevational view showing how the auxiliary idler assembly may be moved towards the head section seen in Fig. 1 upon dismantling of the extensible conveyor;

Fig. 7 is a detailed view of mechanism for urging the auxiliary idler assembly in a direction towards a movable idler assembly of the belt storage loops seen in Fig. 4;

Fig. 8 is a sectional view showing how the rails for supporting the idler assembly seen in Fig. 4 are secured to the head section, said view being taken looking in the direction of the arrows 8—8 of Fig. 4; and Fig. 9 is a detailed perspective view showing a detail of means for locking the auxiliary idler assembly in position.

Referring now to Figs. 1 to 3 of the drawings there is shown an extensible belt conveyor indicated generally by the reference numeral 10 and consisting of a head section 11, a tail section 12 and intermediate sections 13. A conveyor belt having a conveying reach 14 and a return reach 16 extends between the head section 11 and the tail section 12. The conveying reach 14 is supported upon a pair of laterally spaced flexible strands 17, 17 which are anchored at their outby ends as at 18 to the head section 11. The flexible strands 17 are reeved around a pair of idler sheaves 19 and 21 at the tail section 12, each of the strands 17 being wound upon a take-up drum 22 to maintain the proper tension upon the strands 17.

The spaced flexible strands 17 support the conveying reach 14, troughing roller assemblies 23 for support of the conveying reach 14 being spaced at intervals throughout the length of the strand 17 and suspended therefrom. Support standards 24 have saddles 26 at the top thereof for the strand 17, see also Fig. 5, and each standard 24 has a ground engaging member 27. The support standards 24 are maintained the proper distance apart by a lower laterally extending strut 25 and an upper strut 30. A return idler 28 for the return reach 16 is mounted between the standards 24 and is supported upon the lower strut 25.

The head section 11 includes spaced side frames 29 having extending therebetween additional troughing roller assemblies 23 for the conveying reach 14. An idler roller 31 is mounted at the discharge end of the head section 11, and the conveying reach 24 is driven by a pair of driving rollers 32 and 33. Gears 34 and 36 drive the rollers 32 and 33 at the same speed and roller 32 is driven from a motor 37 having a driving sprocket 38 connected by a sprocket chain 39 to a driven sprocket 41 on the roller 32.

As seen in Fig. 1 the head section 11 is mounted for movement upon crawler treads 42 driven from a crawler tread driving motor 43.

The tail section 12 likewise consists of spaced side frames 44 which are spanned by additional troughing roller assemblies 23 for support of the conveying reach 14. An idler roller 46 extends between the side frames 44 at the inby end of the tail section 12, and the conveyor belt is reversed in direction thereat. The tail section 12 is likewise mounted for movement upon crawler treads 47, each being driven by a hydraulic motor 48 through a gear reduction unit 50 having a driving sprocket 49 connected by a sprocket chain 51 to a driven sprocket 52 for the endless crawler tread 47.

The tail section 12 is adapted to follow the advance of a continuous miner, not shown, and such miner may be equipped with a transfer conveyor 53 having its discharge end 54 equipped with wheels 56 arranged to ride upon rails 57 disposed on top of the tail section 12. The precise details of such transfer conveyor form no part of the present invention, and may be of the type employing a conveyor belt, as shown, or of the type employing a chain flight conveyor.

The conveyor thus far described with reference to Figs. 1 to 3 inclusive is provided with belt storage loops the lengths of which shorten as the tail unit 12 follows the advance of the continuous miner. As seen with reference to Fig. 4, such belt storage loops are reeved about a fixed idler assembly referred to generally by the reference numeral 60 and a movable idler assembly referred to generally by the reference numeral 60a.

Means are provided for supporting the fixed idler assembly 60 and the movable idler assembly 60a and to this end the head unit 11 has extending inby thereof vertically spaced tubular rails 61 and 62 which are welded near their outby ends to a trunnion plate 63 having a trunnion 64 arranged to swivel in the side frame 29, see also Fig. 8. The rails 61 and 62 extend inby to the standards 24 inby of the head section 11, and are joined thereat to similarly vertically spaced rails 66 and 67.

As seen in Figs. 5 and 6 rail 62 is joined to rail 66 by means of a sleeve connector 68. Rail 61 is joined to rail 67 by means of a similar sleeve connector 69. Sleeve connector 68 is welded to an upper limb 71 of a stirrup 72, sleeve connector 69 being welded to a lower limb 73 of the stirrup 72, the said stirrup having a stiffening member 74 welded at its upper and lower ends to the standard 24. It will be noted in Fig. 5 that the standards 24 are thus made discontinuous for movement of the idler assembly 60a past such standard 24.

Referring now to Figs. 4 and 8, the movable idler assembly 60a consists of side frame plates 76, each having a pair of stub axles 77 extending therefrom and supporting a grooved roller 78 arranged to ride between the vertically spaced rails 61 and 62 or vertically spaced rails 66 and 67. A pair of idler rollers 79 and 81 are supported by the side frame plates 76, and as seen in Fig. 4 the return reach 16 of the belt is reeved around the idler rollers 79 and 81.

The fixed idler assembly 60 consists of spaced side frame plates 82, each side frame plate 82 having a pair of stub axles 83 extending therefrom supporting grooved wheels 84 arranged to be supported by the vertically spaced rails 66 and 67 and therebetween. The idler assembly 60 has idler rollers 86 and 87 supported by the spaced side frame plates 82, and as seen in Fig. 4 the return reach 16 is reeved around the idler rollers 86 and 87.

The idler assembly 60 is normally maintained in fixed position and is held in such position by a hook 88 connected at 89 to the assembly 60 and around a pin 91 of an abutment 92 supported at the inby end of the rails 66 and 67.

Means are provided for imposing tension upon the belt storage loop reeved between the fixed idler assembly 60 and the movable idler assembly 60a, such belt storage loops being considered as having reaches 93, 94, 96 and 97 therebetween. To this end there is provided a motor driven winch 98 around which is wrapped a cable 99 trained about a sheave 101 at the movable idler assembly 60a and around a fixed sheave 102 mounted at 103 to the head unit 11. The other end of the cable 99 is connected by a hook 104 which in turn is connected to a limit switch indicated generally by the reference numeral 104a. The change in tension of the cable 99 operates the limit switch 104a to control the operation of the winch motor 98 to wind in or pay out the cable 99 and in turn impose the proper tension upon the conveyor belt. The details of such construction are old in the art and so need not be adverted to in detail in this specification.

An auxiliary idler assembly is provided to support the return reach 16 and the reaches 93, 94 and 96 reeved between the fixed idler assembly 60 and the movable idler assembly 60a to prevent the reaches from rubbing against each other, which would require additional power for additional operation of the conveyor. Referring now to Figs. 5 and 6 of the drawings, such an auxiliary idler assembly is referred to generally by the reference numeral 105, and includes spaced frame plates 106, 106 which are spanned by idler rollers 107, 108, 109 and 111, said rollers supporting respectively the reaches 16, 93, 94 and 96 as seen in Fig. 5. The side frames 106, 106 each have extending therefrom a pair of stub shafts 112, each of the stub shafts supporting a grooved roller 113 riding between the vertically spaced rails 61 and 62 or 66 and 67.

The auxiliary idler assembly 105 is urged at all times in a direction towards the movable idler assembly 60a. A flexible strand 114 is connected at 116 to the auxiliary idler assembly 105 and is wrapped about a drum 117 supported on the movable idler assembly 60a. A spiral spring 118 has its inner end anchored to a dead shaft 121 upon which the drum 117 is supported, the other end 122 of the spiral spring 118 being anchored to the drum 117. The action of the spring 118 is such at all times to tend to wrap the strand 114 thereon.

Normally, however, particularly when the idler assembly 60a is remotely disposed with reference to the fixed idler assembly 60, the auxiliary idler assembly 105 is anchored against movement towards the movable idler assembly 60a. As seen in Figs. 6 and 9, one of the stub axles 112 on each side of the auxiliary idler assembly 105 has an extension which is engaged by a stop arm 123 having a stop finger 124 at the end thereof for engagement with the stub axle 112. The stop arm 123 is pivoted at 126 to the stirrup 72, and has a bell crank extension 127 arranged to limit the counter-clockwise movement of the arm 123 so that the stop finger 124 will be in position for engagement with the stub axle 112.

In Fig. 4 there is shown a position when the fixed idler assembly 60 and the movable idler assembly 60a may be considered as being their greatest distance apart. Under such condition the auxiliary idler assembly 105 will be in locked position through the action of the stop arm 123, the auxiliary idler assembly 105 being urged against the stop finger 124 by the tension of the strand 114. As the conveyor is extended by movement of the tail unit 12 upon its crawler treads 47 the movable idler assembly 60a will be required to move to the right as seen in Fig. 4 to shorten the reaches of the belt between the fixed idler assembly 60 and the movable idler assembly 60a.

The reaches will be successfully shortened in accordance with the advance of the tail unit 12, and the movable idler assembly 60a will move toward the auxiliary idler assembly 105 until the side frames 76 of the movable idler assembly will engage the side frames 106 of the auxiliary idler assembly 105. Successive advances of the tail unit 12 will cause the movable idler assembly 60a to continue to move to the right with the auxiliary idler assembly 105 moving therewith. At all times the reaches of the belt between the movable idler assembly 60a and the fixed idler assembly 60 will be supported by the auxiliary idler assembly 105.

Such movement of the idler assemblies 60a and 105 will continue until all of the belt storage loops have been payed out, at which time a new length of belt must be inserted and the movable idler assembly 60a and the auxiliary idler assembly 105 returned to their original positions.

Upon dismantling of the conveyor the movable idler assembly 60a, the auxiliary idler assembly 105, and the fixed idler assembly 60 can be moved to juxtaposition upon the vertical spaced rails 61 and 62, the fixed idler assembly 60 being first disengaged at its hook 88 for such movement. It may be noted that the stop arm 123 may be lifted as seen in Fig. 6 for movement of the auxiliary idler assembly 105 as seen in Fig. 6.

While the invention has been described in terms of a preferred embodiment thereof, its scope is intended to be limited only by the claims here appended.

We claim as our invention:

1. In an extensible belt conveyor having a conveying reach and a return reach, a pair of idler assemblies having one of said reaches reeved therearound to form a belt storage loop, at least one of said idler assemblies being movable with respect to the other to vary the length of said storage loop in accordance with the length of the conveyor, an auxiliary idler assembly for supporting the reaches of said storage loop, rail means for movement of one of said idler assemblies and said auxiliary idler assembly, means urging said auxiliary idler assembly toward said one idler assembly, means limiting the movement of said auxiliary idler assembly toward the said one idler assembly when said belt storage loop is longer than a predetermined amount, and means whereby said auxiliary idler assembly and the said one idler assembly move upon shortening of said belt storage loop whilst said auxiliary idler assembly supports said belt storage loop.

2. In an extensible belt conveyor having a conveying reach and a return reach, a pair of idler assemblies having one of said reaches reeved therearound to form a belt storage loop, at least one of said idler assemblies being movable with respect to the other to vary the length of said storage loop in accordance with the length of the conveyor, an auxiliary idler assembly for supporting the reaches of said storage loop, means for supporting one of said idler assemblies and said auxiliary idler assembly for movement, a stop against which auxiliary idler assembly is normally disposed, means biasing said auxiliary idler assembly in a direction toward one of said idler assemblies and against said stop, and means whereby said auxiliary idler assembly and the said one of said idler assemblies move upon shortening of said belt storage loop whilst said auxiliary idler assembly supports said belt storage loop.

3. In an extensible belt conveyor having a conveying reach and a return reach, a pair of idler assemblies having one of said reaches reeved therearound to form a belt storage loop, at least one of said idler assemblies being movable with respect to the other to vary the length of said storage loop in accordance with the length of the conveyor, an auxiliary idler assembly for supporting the reaches of said storage loop, means biasing said auxiliary idler assembly toward one of the first named of said idler assemblies, and means whereby said auxiliary idler assembly and the said one of the first named of said idler assemblies move upon shortening of said belt storage loop whilst said auxiliary idler assembly supports said belt storage loop.

4. In an extensible belt conveyor having a conveying reach and a return reach, a pair of idler assemblies having one of said reaches reeved therearound to form a belt storage loop, at least one of said idler assemblies being movable with respect to the other to vary the length of said storage loop in accordance with the length of the conveyor, a movable auxiliary idler assembly for supporting the reaches of said storage loop, and means whereby said auxiliary idler assembly is movable with the first named movable idler assembly when said storage loop is shorter than a predetermined amount.

5. In an extensible belt conveyor having a conveying reach and a return reach, a pair of idler assemblies having one of said reaches reeved therearound to form a belt storage loop, at least one of said idler assemblies being movable with respect to the other to vary the length of said storage loop in accordance with the length of the conveyor, a movable auxiliary idler assembly for supporting the reaches of said storage loop, a stop against which said auxiliary idler assembly is normally disposed, and means for moving said auxiliary idler assembly with the first named movable idler assembly when said storage loop is shorter than a predetermined amount.

6. In an extensible belt conveyor having a conveying reach and a return reach, a pair of idler assemblies having one of said reaches reeved therearound to form a belt storage loop, at least one of said idler assemblies being movable with respect to the other to vary the length of said storage loop in accordance with the length of the conveyor, an auxiliary idler assembly for supporting the reaches of said storage loop, and means for supporting one of said idler assemblies and said auxiliary idler assembly for movement.

7. In an extensible belt conveyor having a conveying reach and a return reach, a pair of idler assemblies having one of said reaches reeved therearound to form a belt storage loop, at least one of said idler assemblies being movable with respect to the other to vary the length of said storage loop in accordance with the length of the conveyor, a movable auxiliary idler assembly for supporting the reaches of said storage loop, said movable idler assembly adopting a supporting position when said belt storage loop is longer than a predetermined amount.

8. The invention as defined in claim 7 wherein said auxiliary idler assembly is movable from said position when said storage loop is shorter than a predetermined amount.

References Cited in the file of this patent
UNITED STATES PATENTS

| | | |
|---|---|---|
| 2,166,477 | Ruppenthal | July 18, 1939 |
| 2,655,253 | Snead | Oct. 13, 1953 |